July 24, 1923.

R. BONINSEGNI

TRANSMITTING AND REVERSING GEAR

Filed Sept. 2, 1921

Inventor
Ricardo Boninsegni
By his Attorney
Wm Wallace White

Patented July 24, 1923.

1,462,900

UNITED STATES PATENT OFFICE.

RICCARDO BONINSEGNI, OF FLORENCE, ITALY.

TRANSMITTING AND REVERSING GEAR.

Application filed September 2, 1921. Serial No. 497,830.

*To all whom it may concern:*

Be it known that I, RICCARDO BONINSEGNI, a subject of the King of Italy, residing at Florence, Italy, have invented new and useful Improvements in the Transmitting and Reversing Gear, of which the following is a specification.

This invention relates to transmitting and reversing gearing by means of which rotary motion may be converted into a slower motion or into motion in an opposite direction. The novelty consists substantially in the fact that an eccentric is provided on the driving shaft, acting on multiarmed levers that are freely rotatable and similar to toothed wheels, located at regular intervals from each other in a drum fastened to the driven shaft disposed concentrically to the driving shaft, which take into rotatable spur-gear, disposed concentrically to the driving shaft, which, when utilized as transmitting gear, is held fast, whereas on its being used as reversing gear, the driven shaft is held fast.

Figure 1:
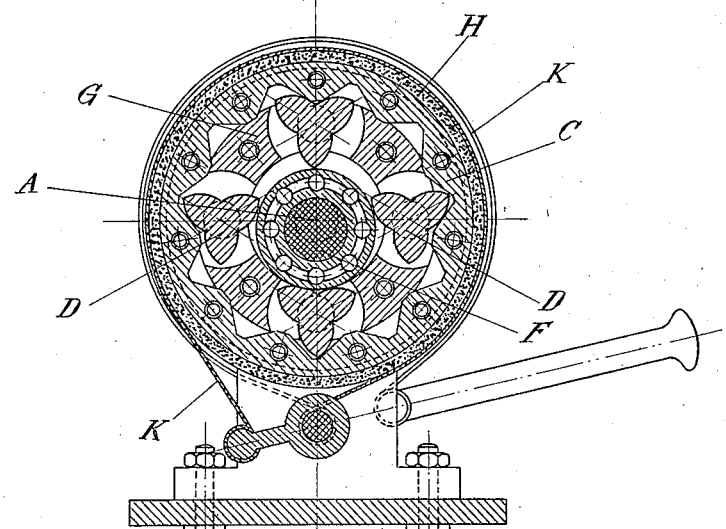
Figure 2:
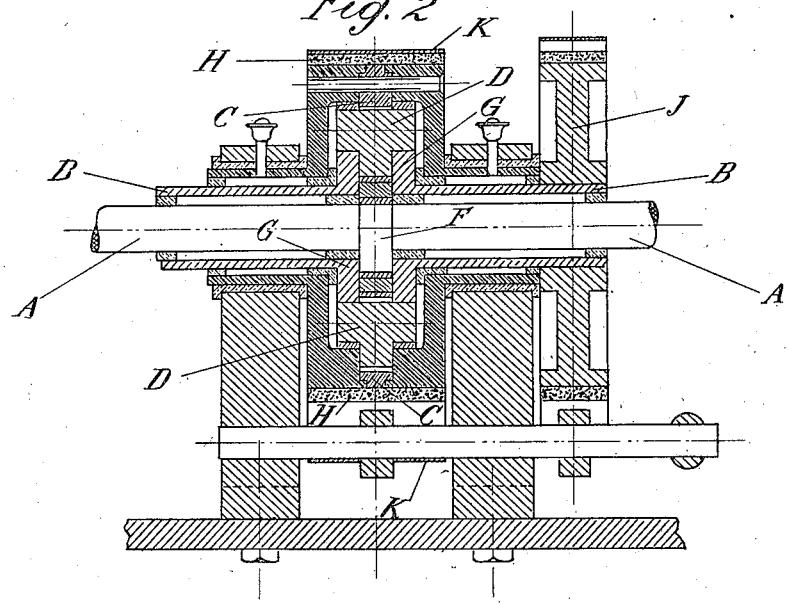

An example of the execution of gearing of this description is represented in Fig. 1 in vertical cross section and in Fig. 2 in vertical longitudinal section. An eccentric —F— is provided on the driving shaft —A—, which may be furnished with an outer ring, running on ball-bearings. This eccentric acts on a number of multiarmed levers —D—, similar to toothed wheels, which are located at regular intervals from each other, freely rotatable, in a drum —G— fastened to the driven shaft —B— concentrically to the driving shaft —A—. These levers —D— similar to toothed wheels, take into internal spur-gear —C— fixed within a casing —H— rotatably located concentrically to shaft —A— and —B—. This casing is shaped in its circumference as a brake or check-disk and may be held fast by means of a check-band —K—. Moreover, a check-disk —J— is fixed on shaft —B— which (disk) may likewise be stopped by means of a check-band.

The eccentric —F— acts in its rotation successively on the inner ends of the levers —D—, similar to toothed wheels, whereby it turns them about their axes, upon which they roll on to the spur-gear —C—. When the latter is held fast by means of the check-band —K—, the levers —D— will engage the spur gear —C—, thereby restraining rotation of the levers on their axes and transmitting motion at a comparatively slow speed to the drum —G— and so to the shaft —B—, the velocity of which depends on the ratio of the number of the toothed-wheel like levers to the number of teeth of the spur-gear —C—. By varying the number of levers —D—, four of which are illustrated in the present instance, the ratio of transmission may be varied.

As is apparent from Fig. 1, the toothed-wheel-like levers —D— are each turned one tooth forward, respectively, at each rotation of the shaft —B— about the shaft —A—. On the other hand, if the shaft —B— is held fast by means of the check disk —J—, while the band —K— is released from the casing —H—, the engagement of the levers with the toothed wheel —C— will cause rotation of the casing in the opposite direction.

Claim:

1. Motion-transmitting mechanism, comprising, in combination, a driving shaft and a driven shaft, an eccentric carried by the driving shaft, a drum carried by the driven shaft in concentric relation to said driving shaft, rotatable members carried by said drum and adapted to be rotated by said eccentric, and means disposed in concentric relation to said shafts and adapted to restrain the rotation of said rotatable members.

2. Motion-transmitting mechanism, comprising, in combination, a driving shaft and a driven shaft, a casing encircling said shafts, rotatable members carried by said driven shaft between said driving shaft and casing, an eccentric carried by said driving shaft and adapted to rotate said rotatable members, and means carried by said casing for engaging said rotatable members thereby to transmit motion from the driving shaft to the driven shaft.

3. Motion-transmitting mechanism, comprising, in combination, a driving shaft and a driven shaft, a casing encircling said shafts, a drum carried by the driven shaft between said casing and driving shaft, a plurality of multi-armed levers mounted for rotation in said drum, an eccentric carried by said driving shaft for rotating said levers, and means carried by the casing for restraining the rotation of the levers thereby to transmit motion from the driving shaft to the driven shaft.

4. Motion-transmitting mechanism, comprising, in combination, a driving shaft and a driven shaft, an eccentric carried by the driving shaft, a casing encircling said shafts, a drum carried by the driven shaft between said casing and driving shaft, rotatable members carried by said drum and adapted to be rotated by said eccentric, and an internal gear carried by said casing and adapted to engage said rotatable members thereby to restrain the rotation thereof and transmit motion from the driving shaft to the driven shaft.

5. Motion-transmitting mechanism, comprising, in combination, a driving shaft, a pair of driven elements encircling said driving shaft, means for holding said elements against rotation, an eccentric carried by said driving shaft, and means between said driving shaft and driven elements and adapted to be engaged by said eccentric for driving one of said elements in one direction when the other element is held against rotation and for driving said other element in the opposite direction when its companion element is held against rotation.

In testimony whereof I have signed my name to this specification.

RICCARDO BONINSEGNI.

Witnesses:
 CAMILLO BRUNO MANNUCCI,
 ANTONIO LOTTINI.